(12) United States Patent
Ahmed et al.

(10) Patent No.: US 10,049,205 B2
(45) Date of Patent: Aug. 14, 2018

(54) ASSERTING IDENTITIES OF APPLICATION USERS IN A DATABASE SYSTEM BASED ON DELEGATED TRUST

(71) Applicant: Oracle International Corporation, Redwood Shores, CA (US)

(72) Inventors: Tanvir Ahmed, Fremont, CA (US); Thomas Keefe, Mill Valley, CA (US); Vikram R. Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/315,288

(22) Filed: Jun. 25, 2014

(65) Prior Publication Data

US 2015/0379257 A1    Dec. 31, 2015

(51) Int. Cl.
*G06F 7/04*     (2006.01)
*G06F 12/00*    (2006.01)
(Continued)

(52) U.S. Cl.
CPC ........ *G06F 21/44* (2013.01); *G06F 17/30424* (2013.01); *G06F 21/31* (2013.01); *G06F 21/6218* (2013.01); *H04L 63/101* (2013.01); *G06F 2221/2115* (2013.01); *G06F 2221/2141* (2013.01)

(58) Field of Classification Search
CPC ............... G06F 21/44; G06F 17/30424; G06F 17/3056; G06F 21/31; G06F 21/6218; G06F 2221/2115; G06F 2221/2141; H04L 63/101
See application file for complete search history.

(56) References Cited

U.S. PATENT DOCUMENTS

2002/0111942 A1\* 8/2002 Campbell ........... G06F 17/3089
2003/0101116 A1    5/2003 Rosko
(Continued)

OTHER PUBLICATIONS

U.S. Appl. No. 14/315,280, filed Jun. 25, 2014, Final Office Action, dated Jul. 15, 2016.
(Continued)

*Primary Examiner* — Linglan E Edwards
*Assistant Examiner* — Forrest L Carey
(74) *Attorney, Agent, or Firm* — Hickman Palermo Becker Bingham LLP; Daniel D. Ledesma

(57) ABSTRACT

Techniques are provided for integrating application-level user security context with a database. A session manager, in a middle tier that includes an application, obtains the security context of a user and establishes, in the database, a light-weight session (LWS) that reflects the security context. The security context is synchronized between the middle tier and database before application code execution. The database maintains an isolated copy of the LWS for the unit of application code executed as the security context. The database sends to the session manager the identifier of the copy of LWS. Before allowing a request from an application to be sent to the database, the session manager, transparent to the application, inserts an identifier that identifies the LWS. In this way, the database processes an application request in the context of the corresponding user's security context that is the same as the security context in the middle tier.

22 Claims, 7 Drawing Sheets

(51) Int. Cl.
*G06F 12/14* (2006.01)
*G06F 13/00* (2006.01)
*G06F 17/30* (2006.01)
*G11C 7/00* (2006.01)
*G06F 21/44* (2013.01)
*G06F 21/31* (2013.01)
*G06F 21/62* (2013.01)
*H04L 29/06* (2006.01)

(56) References Cited

U.S. PATENT DOCUMENTS

| | | | |
|---|---|---|---|
| 2005/0038828 A1* | 2/2005 | Kaluskar | G06F 17/30575 |
| 2006/0026286 A1 | 2/2006 | Lei | |
| 2007/0027896 A1* | 2/2007 | Newport | H04L 67/14 |
| 2007/0283021 A1* | 12/2007 | Wong | G06F 17/3056 |
| | | | 709/227 |
| 2010/0169377 A1* | 7/2010 | Galeazzi | G06F 17/3056 |
| | | | 707/781 |
| 2010/0318570 A1* | 12/2010 | Narasinghanallur | |
| | | | G06F 17/30289 |
| | | | 707/783 |
| 2013/0086652 A1* | 4/2013 | Kavantzas | G06F 21/335 |
| | | | 726/5 |
| 2014/0331337 A1* | 11/2014 | Factor | G06F 21/62 |
| | | | 726/30 |
| 2018/0060603 A1 | 3/2018 | Ahmed | |

OTHER PUBLICATIONS

U.S. Appl. No. 14/315,280, filed Jun. 25, 2015, Notice of Allowance, dated Dec. 14, 2016.

U.S. Appl. No. 14/315,280, filed Jun. 25, 2014, Office Action, dated Mar. 29, 2016.

* cited by examiner

ASSERTING IDENTITIES OF APPLICATION USERS IN A DATABASE SYSTEM BASED ON DELEGATED TRUST

RELATED APPLICATION

This application is related to U.S. application Ser. No. 14/315,280, filed on the same day herewith and incorporated by reference as if fully set forth herein.

FIELD OF THE DISCLOSURE

The present disclosure relates to integrating user security context from an application within a database system that supports the application.

BACKGROUND

Most companies use computers to manage business and financial records. Large databases and various programs are used to keep track of all the information required for companies to do business. In the last decade the information that is stored as part of the databases has become accessible from the Internet and Intranet through Web-based applications. These applications dynamically generate a series of Web documents in a standard format supported by common browsers. Web-based applications are built using three-tiers: browser client, middle-tier application server and database server. The Web browser sends requests to the middle tier. The middle-tier services the request after accessing the database server with queries and updates.

An end user accesses a database through an application that is deployed on a middle tier. When the end user accesses the database through the application, the end user is authenticated by the application or middle tier service like SSO. Authentication credentials may include a username, password, SSL certificate, Kerberos ticket, or any other credentials that may be used to validate the identity of the end user.

Applications are typically developed with a database in mind. Even though many applications require user authentication before servicing user requests for data, in a typical scenario, once an application authenticates a user, any interactions between the application and the corresponding database does not involve the user's security credentials (or "context"), such as a user or group identifier, any roles assigned to the user, and zero or more attributes. In other words, the security credentials of the user are not leveraged by the database. Instead, any requests from the application to the database are sent along "privileged" connections. In other words, the application connects with the database as a highly privileged application user acting on behalf of the end user, regardless of whether the end user is highly privileged or lowly privileged. The "privileged" status indicates that the application can access all application tables, many database resources, etc.

When connecting as a highly privileged application user, the application establishes a session for the highly privileged application user. In one technique, the application may receive a query from a lowly privileged end user, query the database server in a session created for the highly privileged application user, receive a set of results from the database server that includes highly privileged data and lowly privileged data, and remove the highly privileged data from the results before sending the results to the end user. In this technique, the identity of the end user is unknown to the database and security is enforced only in the application that is deployed on the middle tier.

In a different security framework, instead of a mid-tier application enforcing security policies and removing highly privileged data from a set of query results from the database server, the database server is responsible for enforcing data security policies. Here, the mid-tier application sends an end-user's security context, such as a user identifier and any end-user roles to the database. Some mid-tier applications use language-level protection of users' security context, such as Java applications. Currently there is no direct integration between such mid-tier applications and database technology with respect to the security context.

One ad hoc approach to integrate a user's security context in Java with a database system is for a mid-tier application to call APIs to create and manage application sessions in the database and to update the user's security context if the user's security context changes. However, such an approach suffers from not being transparent, generic, secure, or efficient. Regarding transparency (or lack thereof), an application developer must programmatically call APIs (or send database statements, such as DMLs) to set up and use the security context. The ad hoc approach is not generic because different applications may implement the integration in different ways, even though the applications are solving the same problem.

Regarding the lack of security, the security context must be set up based on an authenticated user's identity. The security context should be stored internally in a secured manner and should not be tampered. However, the application usually does not have an infrastructure to support such secure storage. Additionally, the application treats the security context the same as normal application data. Such treatment can easily cause security issues and is error-prone.

Lastly, regarding lack of efficiency, the ad hoc approach results in unnecessary API calls and data propagation as well as inefficiency in using the security context.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Multi-Tier System Overview
3.0. Database System Overview
4.0 Data Access Control Policies
5.0 Integrating a User's Security Context in a Database
    5.1 Security Context Synchronization
    5.2 Piggybacking
    5.3 Example Middleware Process
    5.4 Database Session Management
        5.4.1 Single User/Multiple Database Sessions
        5.4.2 Single User/Multiple Applications
        5.4.3 Example Database Process
6.0 Asserting Identities of Application Users in a Database System
    6.1 Delegating Trust
    6.2 Allowing Session Management Operations
    6.3 Transparency Scenarios
    6.4 Secure Exchanges of Trust Data
    6.5 Example System Architecture For Delegating Trust
    6.6 Example Process For Delegating Trust
7.0 Hardware Overview 1.0 General Overview Techniques are provided for allowing a database system to enforce application data security policies based on the identity of an application user. The database system natively enforces application-defined policies within the database system based on the application user's identity. A user's security context is securely and transparent propagated from the middle tier (in which the application executes) to the database system. The application is not required to make any explicit API calls to create a user's security context and use the security context for a database access. Embodiments achieve transparent end-to-end integration of an end-user security context from an application server (or middle tier) to the database.

2.0 Multi-Tier System Overview

Figure 1:
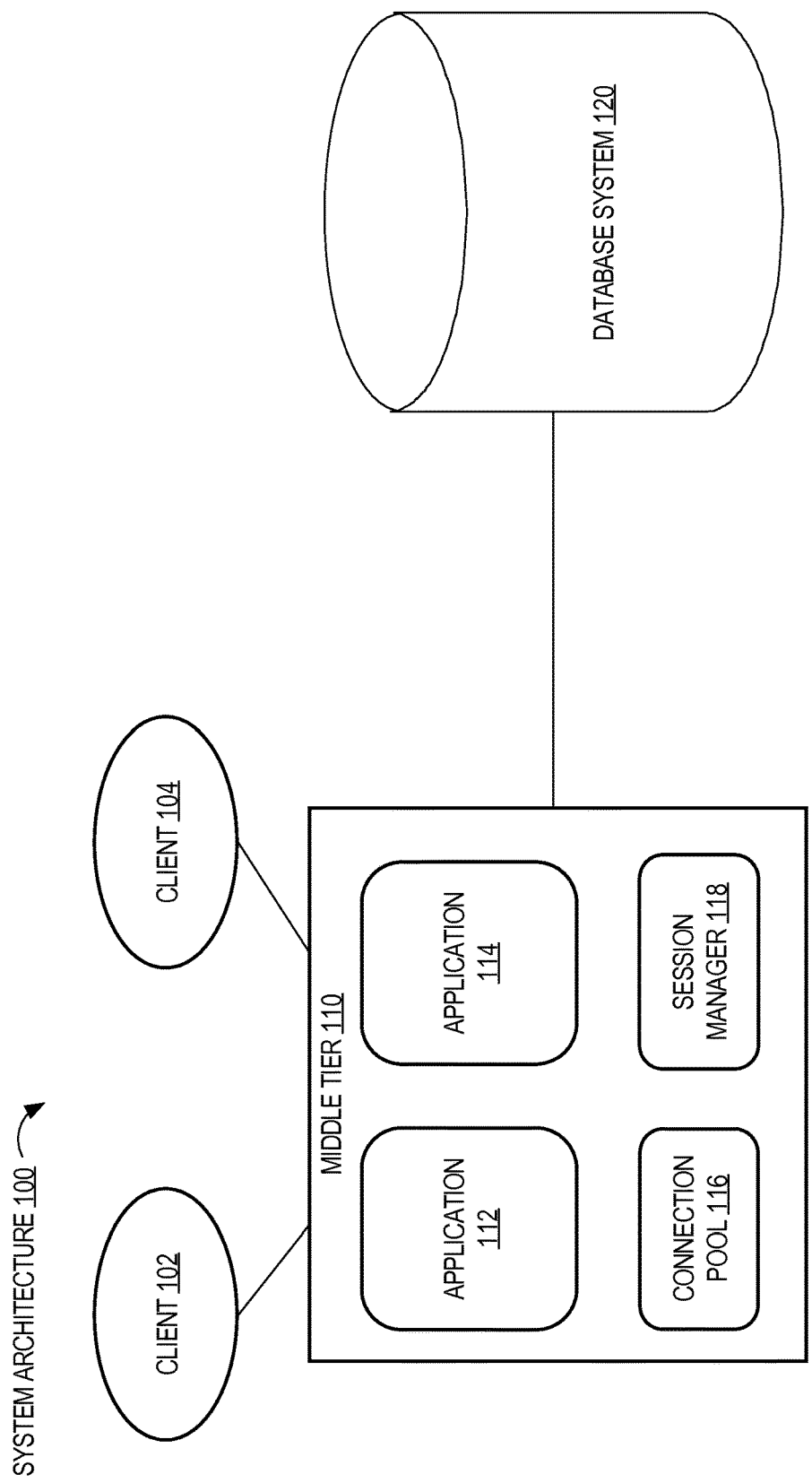
FIG. 1 is a block diagram that depicts an example system architecture, in an embodiment.

FIG. 1 is a block diagram that depicts an example multi-tier system architecture 100, in an embodiment. Multi-tier system architecture 100 includes clients 102 and 104, a middle tier 110, and a database system 120.

Each of clients 102 and 104 submit requests, initiated by end-users, to middle tier 110. Each of clients 102 and 104 may be a web browser and the requests may be HTTP requests that are transmitted over a network using a communications protocol, such as IP. Although only two clients 102 and 104 are depicted, middle tier 110 may support and service requests from many more clients.

Middle tier 110 comprises one or more application servers and applications 112 and 114 that process client requests. Although only two applications are depicted, middle tier 110 may include a single application or more than two applications. Example applications 112 and 114 include a CRM (customer relationship management) application and a HCM (human capital management) application. Though not depicted, middle tier 110 may include one or more services that applications 112 and 114 both utilize. In this way, application developers can focus on implementing the business logic of their applications. Example services include user authentication, session and transaction management, clustering, fail-over, and load-balancing.

In response to receiving a client request, applications 112 and 114 send requests to database system 120 through database connections. One example technology that may be used to establish a connection with database system 120 and submit database requests is Java Database Connectivity (JDBC). Other (e.g., non-Java-based) connection technologies may be used to establish a database connection.

One service that middle tier 110 might provide to applications 112 and 114 is connection pooling. A connection pool (such as connection pool 116) is a cache of database connections that are maintained so that the connections can be reused when future requests to a database system are required. Connection pools are used to enhance the performance of executing commands on a database system. Opening and maintaining a database connection for each user (especially requests made to a dynamic database-driven website application) is costly and wastes resources. In connection pooling, after a connection is created, the connection is placed in a pool and is used over again so that a new connection does not have to be established. If all the connections in a pool are being used, then a new connection may be made and added to the pool. Connection pooling cuts down on the amount of time a user must wait to establish a connection to a database.

Middle tier 110 may include a single connection pool to which all applications in middle tier 110 access. Alternatively, middle tier 110 may include multiple connection pools. For example, application 112 may only obtain connections from connection pool A while application 114 may only obtain connections from connection pool B. As another example, one or more attributes of a client request (other than the application that is the target of the client request) may be used to determine from which connection pool a connection will be obtained. Examples of such attributes include the source of the requested data (e.g., a particular table or database object), the type of the requested data (e.g., video v. relational data), and the location of the client.

As noted previously, one service that middle tier may provide to applications 112 and 114 is an authentication service (not depicted). The authentication service may receive user credentials (e.g., a username and password) from client 102, send the user credentials to an external authentication server, and retrieve authentication data from the external authentication server. The authentication data may include a user identifier and/or a group identifier.

A component in middle tier 110 may then determine, based on the user/group identifier, one or more application roles that have been assigned to the end-user. An application role is a logical grouping of application privileges that are required to accomplish a task. An application role may be granted to one or more other application roles. Application roles are used to associate application users with privileges. The component that determines the application role(s) may be the authentication service, one of applications 112 or 114, or another component in middle tier 110.

The role(s) that are determined based on the client request may be dependent on which application the client request is targeting. For example, if a client request is for application 112, then a first set of one or more roles is identified. If the client request is for application 114, then a second set of one or more roles (that is different than the first set) is identified.

In an embodiment, database system 120 defines roles. In one mode, database system 120 grants certain roles to certain users and a mid-tier application determines the roles that will be enabled for a particular end-user during a particular session. The roles that are enabled by the mid-tier application may be a strict subset of the roles that are granted to the particular end-user in database system 120. In another mode, a component in middle tier 110 determines which roles are granted to the particular end-user and the mid-tier application selects one or more of those roles to enable for the particular end-user for a particular session.

The combination of a user/group identifier and one or more roles that are assigned to an end-user is referred to as the user's "security context."

3.0 Database System Overview

Database system 120 comprises a database and a database management system that manages the database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting, to the database server, commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. A process is an allocation of memory, CPU time for executing software, and possibly other computer resources, the allocation being made by the operating system on the computer system on which the process is running. In the case of process for a database server, the process executes database server software.

Resources from multiple nodes in a multi-node database system can be allocated to running a particular database server's software. Each combination of the software and allocation of the resources from a node is a server that is referred to herein as a "server instance" or "instance".

4.0 Data Access Control Policies

In an embodiment, database system 120 implements a data access control policy that provides row-level and/or column-level access control to data stored in database system 120. The data access control policy may be specified using one or more access control lists. Each access control list specifies what privileges (e.g., read or write) can be performed by which principals, where each principal is a user or role in the database system. A write privilege may involve the ability to perform all types of write operations, including insert, update, and delete. Alternatively, each type of write privilege may be granted separately. For example, an access control policy for one data realm may allow an insert privilege and an update privilege but not a delete privilege.

In addition to specifying what privileges are granted to particular principles, privileges may also be explicitly denied to one or more principals in an access control list.

In order to specify what privileges are granted or denied to particular principals, each access control list includes one or more access control entries that define a mapping from a principal to a granted or denied privilege. For example, an access control entry may specify that a first user is granted access to read, while another entry may specify that users in a defined "marketing" role are denied the privilege to update data. Thus, each access control entry may specify at least a particular privilege, a value indicating whether the privilege is granted or denied, and a principal.

Access control lists are associated with particular rows of a database table by a condition or predicate (referred to herein as "access predicates") that specifies the rows to which each access control list is applicable. An access predicate may be specified, for example, as a Structured Query Language (SQL) expression or any other suitable expression for identifying one or more rows of a database table. The combination of an access control list and an access predicate is referred to herein as a data realm. In other words, a data realm comprises (1) an access control list, and (2) an access predicate identifying the one or more database table rows to which the access control list is applicable. Each row of a table may have associated with it one or more data realms. A data access control policy is a collection of one or more data realms that define the access privileges to particular principals to particular rows of one or more database tables.

When a principal submits a query to a database server, a database server enforcing a data access control policy determines whether a table identified by the query is associated with one or more data realms. If the database server determines that the query identifies such a table, then, during query execution, the database server will evaluate the data realms associated with the table for each row requested in the query. If an associated data realm includes an access control list that either grants or denies the requested privilege to the requesting principal and the associated access predicate is true for the current row under evaluation, then access to the row is granted or denied to the principal, respectively. If all of the associated data realms are evaluated without an explicit grant or deny result, then access to the row may be denied to the principal by default.

5.0 Integrating a User's Security Context in a Database

As depicted in FIG. 1, middle tier 110 also includes a session manager 118. Session manager 118 may be implemented in software, hardware, or a combination of hardware and software. Session manager 118 acts as a trusted layer to applications 112 and 114 and to database system 120. Session manager 118 is responsible for managing sessions between applications in middle tier 110 and database system 120.

In an embodiment, session manager 118 is one of multiple components in a trust domain of middle tier 110. Other components in the trust domain may include an authentication component that is responsible for authenticating an application user and an authorization component. In an embodiment, such components are supported by a Java Authentication and Authorization Service (JAAS). Session manager 118 may be deployed within the same protection domain that authenticates end-users identities.

Session manager 118 initiates the creation of light-weight sessions (LWSs) on database system 120. A LWS is an application session in database system 120 and is different from a traditional database session. While both a database session and an application session are managed by a database system, a LWS is for an end user of a mid-tier application rather than a database user. A LWS is created in database system 120 in response to a user being authenticated by middle tier 110 (or an authentication service that is external to middle tier 110). For example, a client request received at middle tier 110 may include a username and password. An authentication service associated with middle tier 110 determines authentication data for the user based on the username and password. The authentication data may be a user identifier and/or group identifier. Session manager 118 stores the authentication data and is responsible for sending the authentication data to database system 120. The database system 120 may use the user/group identifier for auditing purposes and/or for security purposes to enforce security policies in light of the specific user. For example, a security policy on a table may include a user-specific or group-specific policy.

Another component in middle tier 110 may determine one or more roles based on the authentication data and then inform session manager 118 of the role(s). The role(s) may be determined based on a subsequent client request that requests data from a particular application (e.g., application 112) in middle tier 110. The role(s) may be computed for each client request because the roles assigned to a user may have changed between two client requests. A change notification may be implemented between the mid-tier component that determines the role(s) and session manager 118.

Additional, session manager 118 may be configured with additional roles based on the application accessed. Such additional roles are referred to as dynamic roles, which may be used to grant database object privileges. Either way, session manager 118 transmits determined role(s) to database system 120. As noted previously, the combination of a user's role(s) and the user's user/group identifier(s) is referred to as the user's security context.

Session manager 118 guarantees that only an authenticated user's security context (e.g., user/group ID, roles, and attributes) is used to set up an LWS in database system 120.

5.1 Security Context Synchronization

Before execution of application code, session manager 118 synchronizes the security context of a user with a LWS on database system 120. A user's security context may be stored in an application's software object that represents an authenticated user. In Java, such an object belongs to the class "Subject." An object of class Subject represents a grouping of related information for a single entity, such as a person. The grouping of related information includes the Subject's identity or identities) as well as the Subject's security-related attributes, which may include passwords and cryptographic keys. Subject attributes may be used as data access control policies in database system 120. An example of such an attribute is "Organization" and values for that attribute may be, for example, "West" and "East" Thus, some data access control policies may only allow access to users that are associated with the value of "West" as the "Organization" attribute, Another example attribute is IP address, where only a specific set of one or more IP addresses is used as a data access control policy, such that users who are associated with different IP addresses are not allowed to access a certain set of data stored in database system 120.

Synchronization involves session manager 118 sending a user's security context to database system 120 and, in response, receiving, from database system 120, a LWS identifier that uniquely identifies the corresponding LWS and the object that represents the user.

In an embodiment, session manager 118 sends authentication data to database system 120 before all of an authenticated user's security context is known. For example, session manager 118 creates a session and initiates a LWS on database system 120 using only a user/group identifier of the user. After that point, session manager 118 stores a LWS ID for the session. Later, after the role(s) of the user are determined (e.g., in response to a subsequent request from the corresponding client), session manager 118 transmits the role data and a LWS ID to database system 120, which updates its LWS to include the role data. Session manager 118 may use the mid-tier application's connection (from connection pool 116) to initiate the above create session/assign user roles operations. These operations are performed transparently, from the mid-tier applications, in the infrastructure layer of middle tier 110.

In an embodiment, session manager 118 determines whether the user's security context has changed between the time the LWS was initially established and the role(s) of the user are determined. Although rare, some of the security context may have changed, such as the user's user/group identifier. This determination may be performed using a principle change notification mechanism, which may involve a version number. Whenever a set of principles is computed, a version number is assigned. If a principle change occurs at a repository (such as an identity store), then the version number will increase. Session manager 118 may compare the version numbers to determine whether the version numbers are different. If the version numbers are different, then it is presumed that the one or more attributes have changed and session manager 118 sends the updated security context information to database system 120.

Synchronization between the application (e.g., application 112) and database system 120 occurs before execution of the application code to ensure that the same security context data is being used. Such synchronization may be done in either request scope or session scope (i.e., from logon to middle tier 110 to logoff from middle tier 110). For example, if application 112 is a JavaEE web-based application, then synchronization is done at HTTP request scope.

After the application and database system 120 are synchronized, the application code is executed. The application code may include one or more (e.g., SQL) queries and/or (e.g., PL/SQL) calls.

5.2 Piggybacking

For each query call from an application (e.g., application 114), session manager 118 "piggybacks" the corresponding security context data with the query call to database system 120 in subsequent communications between the application and database system 120. When the application requests access to database system 120, session manager 118 propagates the corresponding security context data to database system 120 securely and transparently to the application. In the context of Java, piggybacking occurs within the boundary of Java's Subject.doAs. This guarantees the correctness of the session attach, because mid-tier application code is executed within Subject.doAs, using Subject to enforce access control. Within this boundary, the Subject remains consistent. Thus, piggybacking guarantees that only the current user's security context is sent to database system 130 and prevents the wrong security context from being sent.

In an embodiment, this piggyback mechanism involves sending the LWS ID instead of the entire content of the user's security context. Session manager 118 may identify the correct LWS ID based on the current Subject object that is part of the current thread of execution. Session manager 118 may have access to a mapping that maps Subject objects to their respective LWS IDs.

In an embodiment, sending security context data involves session manager 118 using JDBC and digital signature mechanisms, such as a hash computed with session manager 118's secret key to authorize a session attach operation on behalf of mid-tier application code.

Because the LWS ID may be piggybacked on an application data request to database system 120, explicit calls to database system 120 to attach a session and detach the session are not necessary. This piggyback approach thus involves automatically attaching a session to a connection. In an alternative embodiment, session manager 118 explicitly makes an attach session call to database system 120 and includes the LWS ID in the call prior to sending the application data request to database system 120.

Synchronization and piggybacking are all performed without a mid-tier application having to call any API to enable a user's security context in database system 120 or to manage sessions on database system.

5.3 Example Middleware Process

Figure 2A:
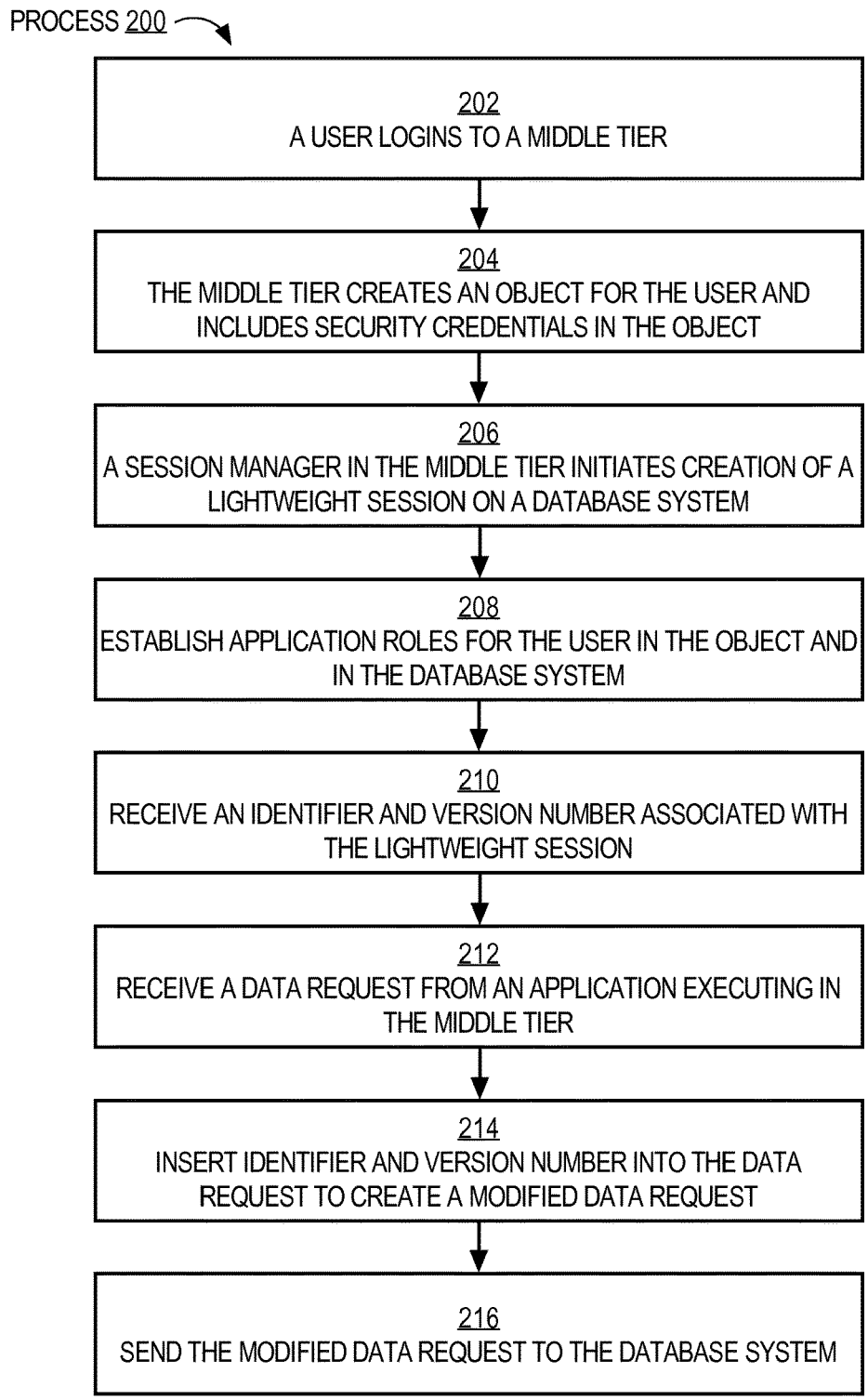
FIG. 2A is a flow diagram that depicts a process for securely sending user security context data to a database system, in an embodiment.

FIG. 2A is a flow diagram that depicts a process 200 for securely and transparently sending user security context data to a database system, in an embodiment. Process 200 is also described in the context of FIG. 2B, which is a block diagram that depicts processing in middle tier 110 and database system 120.

At block 202, a user logins to middle tier 110. The user provides a username and password.

At block 204, middle tier 110 creates an object (i.e., a Subject object in Java) that contains security credentials of user, such as a user/group identifier determined using an authentication component of middle tier 110.

At block 206, session manager 118 initiates creation of a LWS on database system 120. Blocks 202-206 correspond to pseudo code portion 252 in FIG. 2B. As a result of blocks 202-206, a LWS named 'S1' is created in memory area 272 in global memory 270 of database system 120.

At block 208, application roles for the user that logged in to middle tier 110 are determined and set up on the object that represents the user and in the LWS in database system 120. Block 208 corresponds to pseudo code portion 254. As a result of block 208, a copy of session 'S1' is copied into memory area 274 of global memory 270. This copy includes role information that was determined after the Subject object and the LWS were created.

In an alternative embodiment, the user/group identify is not sent to database system 120 until the entirety of a user's security context (including roles) are determined. This is a "lazy" approach to creating a LWS. Thus, a LWS might not be created until the entirety of the security context is known.

At block 210, an identifier and version number associated with the security context is received from database system 120. Block 210 may involve session manager 118 storing the identifier and version number in association with user information that uniquely identifies the user that initiated the client request(s) to middle tier 110. For example, session manager 118 maintains a mapping between (1) Subject objects that represent different users and (2) LWS identifiers and version numbers.

If the alternative embodiment under the "lazy" approach is implemented, then block 210 comprises receiving an identifier without a version number or with a version number that indicates that the corresponding session in database system 120 is the first version of the session.

Figure 2B:
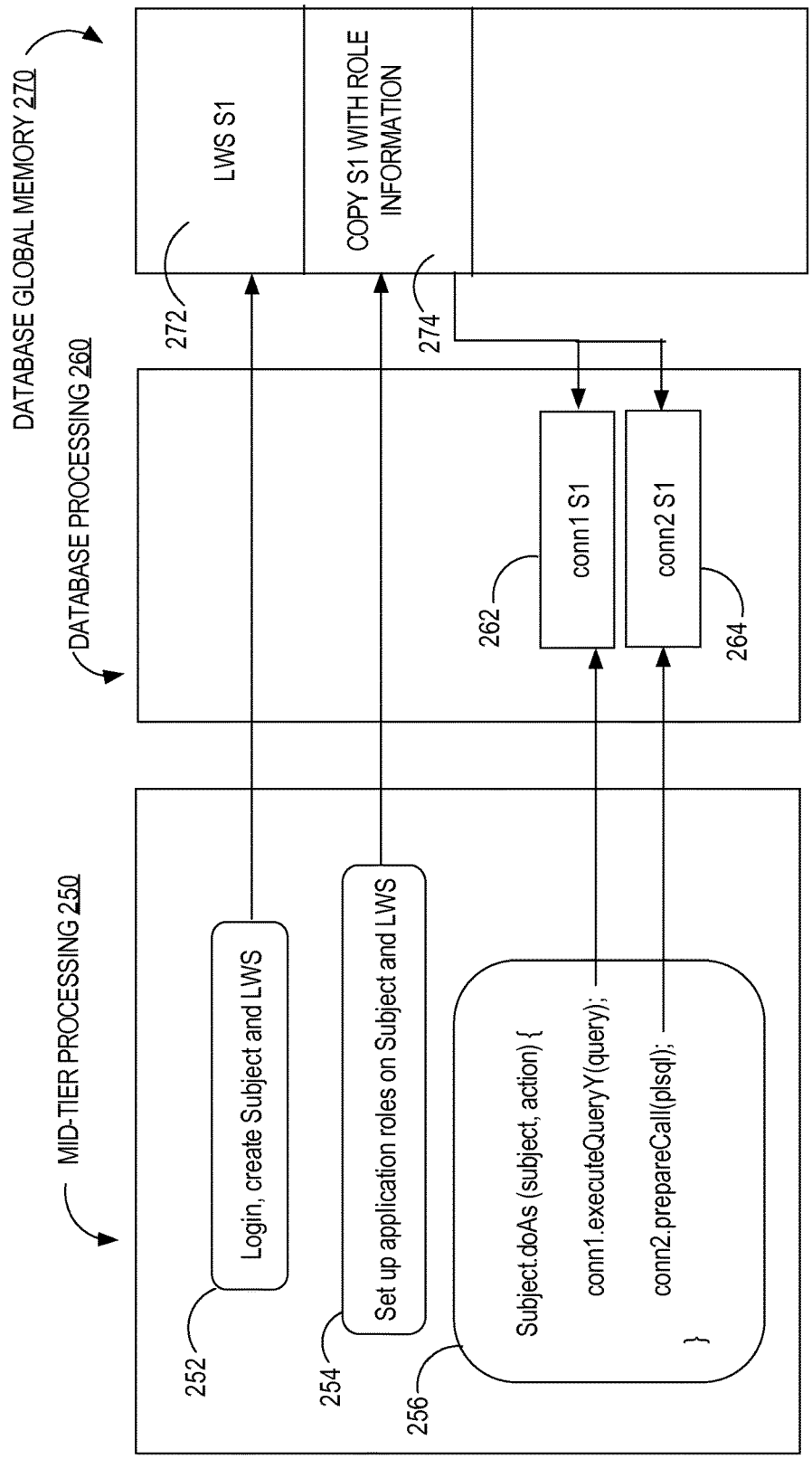
FIG. 2B is a block diagram that depicts processing in the middle tier and a database system, in an embodiment.

At block 212, a data request from application 112 is received. In FIG. 2B, block 212 is part of pseudo code portion 256. The data request may include a SQL query for database system 120 to process. Each data request from application 112 is executed in the context (i.e., Subjec.doAs in Java) of the object that represents the end user and includes the user's security context. Thus, block 212 may involve identifying user information associated with the request and using that user information to lookup a corresponding database-generated identifier (and, optionally, a version number).

Once the application code corresponding to pseudo code portion 256 is executed, the user's security context cannot change. The security context remains fixed throughout the application code execution (which is within Subject.doAs in Java).

At block 214, the identifier and version number (received in block 210) is inserted into the request to create a modified request. Alternatively, session manager 118 explicitly calls a session management operation, such as attach session, using the identifier. However, explicitly making an attach session call requires an additional round trip with database system 120.

At block 216, the modified request is sent to database system 120 using a database connection.

Blocks 202-216 occur transparently with respect to mid-tier applications 112 and 114. The mid-tier applications are not required to have any code to keep track of role information or session identifiers or manage sessions with database system 120.

In the example of FIG. 2B, pseudo cord portion 256 indicates that two different of data requests are sent to database system 120. Database processing 260 involves managing two connections with middle tier 110: connection 262 and connection 264. Connection 262 corresponds to connection 'conn1' in middle tier 110 and connection 264 corresponds to connection 'conn2' in middle tier 110. Database processing 260 involves attaching the LWS to two different connections. Each connection relies on the same LWS data stored in memory area 274. Attaching the LWS to each connection involves copying the LWS from memory area 274 to a private memory area (not depicted).

5.4 Database Session Management

In an embodiment, database system 120 creates a LWS in global memory and copies the LWS data from global memory to private memory. For example, a portion of the global memory may store multiple LWS, each of which is associated with a different LWS ID. Copying data of a particular LWS may be performed in response to database system 120 receiving a data request from an application (e.g. application 112) through a (e.g., JDBC) database connection. In response to receiving the data request, database system 120 identifies security context data within the data request. As noted previously, the security context data may be a LWS ID instead of the entire security context (including roles) of the user. A database process that processes the data request identifies, in global or shared memory, the LWS data that is associated with the LWS ID, and performs, based on the LWS data, the work requested by the data request.

Database system 120 treats the identification of a LWS ID within an application's data request as an implicit call to leverage security data to process the data request. In this way, an explicit session management call (e.g., attachSession) may be avoided altogether. If an LWS ID is not included in a data request, then database system 120 may conclude that role-based processing of the data request is not required. The data request will fail if the connection pool user does not have any privileges.

5.4.1 Single User/Multiple Database Sessions

In an embodiment, LWS data for a single user may be shared by multiple database sessions. A single end-user request (e.g., from client 102) may result in multiple connections between an application in middle tier 110 and database system 120. For each connection, a different database session is created in database system 120. For each database session, the same LWS data for the end-user is copied into that database session and used when performing database operations.

5.4.2 Single User/Multiple Applications

A single user may be associated with a single LWS at database system 120 but initiates access to database system 120 from different applications in middle tier 110. Each access may be associated with different role(s) that are specific to that particular application. Thus, the LWS is modified with different application roles before the LWS is attached to each database session. For example, user U may be authenticated to middle tier 110 and then initiate a first request application 112 and a second request to application 114. For application 112, user U may have roles R1, R2, and R3. In contrast, for application 114, user U may only have role R4.

In an embodiment, for each of multiple applications in middle tier 110, database system 120 copies LWS data (of an end-user) in global memory for that application. Session manager 118 communicates with database system 120 to synchronize the application roles of the corresponding application with the appropriate LWS data before each application data request (or query) is submitted, so that a consistent security context is used at database system 120 for each data request.

In some situations, a single end user request needs to be served by multiple database sessions. For example, a single web page may require multiple database queries to be performed. Each database query corresponds to separate code and independently requests a connection from a connection pool. In such a situation, all of the database sessions attach to the same LWS, which is the cloned copy of the security context for the application. At end of the data request, the cloned-copy of the LWS is promoted to be the single LWS.

5.4.3 Example Database Process

Figure 3:
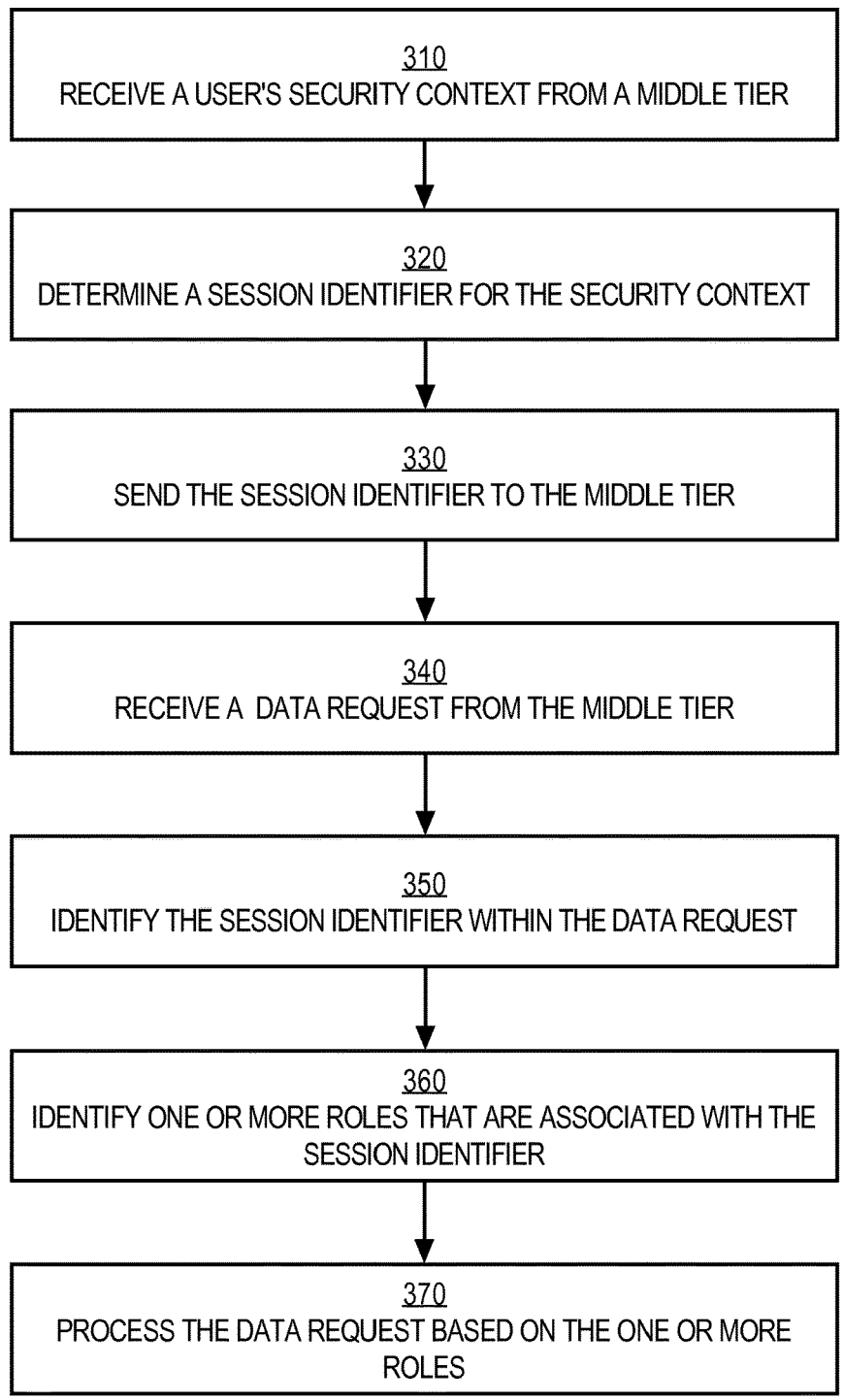
FIG. 3 is a flow diagram that depicts a process for securely receiving user security context data at a database system, in an embodiment.

FIG. 3 is a flow diagram that depicts a process 300 for securely receiving user security context data at a database system, in an embodiment. Process 300 is similar to process 200; however, process 300 is performed by database system 120.

At block 310, a user's security context is received from session manager 118 executing in middle tier 110. Previous to this block, database system 120 may have received authentication data (e.g., a user/group identifier) from session manager 118. Thus, the security context that database system 120 receives in block 310 may include role information that was not sent previously. In that case, database system 120 updates a LWS that is associated with the authentication data to include the role information.

At block 320, a LWS identifier is determined for the security context. The LWS identifier may be generated in response to receiving the security context or may be retrieved from a set of pre-defined (and currently unused) LWS identifiers.

At block 330, the LWS identifier is sent to middle tier 110.

At block 340, an application request to perform one or more operations on data that is stored in database system 120 is received from middle tier 110.

At block 350, the application data request is analyzed to identify the LWS identifier within the application data request.

At block 360, LWS identifier is used to identify, in global memory of database system 120, one or more roles that are indicated in a LWS that corresponds to the LWS identifier.

At block 370, the application data request is processed based on the one or more roles.

6.0 Asserting Identities of Application Users in a Database System

Traditional database systems do not support the concept of application end-users. End-user identities are authenticated by application servers and the corresponding applications act as a privileged database user when using a connection pool to access data. Such an approach has significant problems. For example, a session having a privileged connection pool user requires custom development of reference monitors. As another example, due to lack of privilege isolation, a session having a privileged connection pool user causes security vulnerabilities in the database, such as session context switch using SQL, as the mid-tier application always executes as a privileged database user, where privileges include creating a session and attaching a session. It is possible for a first end-user to initiate a SQL injection attack where the end-user can detach its LWS and attach an existing (or newly created) LWS corresponding to another end-user who has greater access privileges than the first end-user.

In one approach, application end-users are introduced in the database. Correspondingly, there are users' application sessions (or LWSs) in the database. These application users can be provisioned in the database or in an identity store. In a middleware-driven application, application users are authenticated by the middleware at runtime. With application end users' sessions in the database, the pre-authenticated connection pool sessions are no longer feasible because (1) there are many application end users, (2) each application end user would need to be associated with its own connection, and (3) it is not known ahead of time which users will connect to the database. This requires that the database system authenticate application users in order to avoid the SQL injection attach scenario described previously.

One approach for a database system to authenticate application users is to introduce additional identity or authorization assertions, similar to the identity asserted by the middle-tier application server. Middle-tier application servers typically implement single-sign-on (SSO), which requires an end-to-end trust establishment for identity assertion. SSO requires that all the parties establish trust by registration as well as maintain trust by rekeying and invalidating credentials. However, implementing SSO in database system 120 would require runtime interaction between database system 120 and an identity store.

6.1 Delegating Trust

According to an embodiment, trust is established between middle tier 110 and database system 120 so that a component of middle tier 110 can authenticate end-users on behalf of database system 120. In this way, the component of middle tier 110 asserts the identity of end users to database system 120. This approach avoids the runtime interaction between database system 120 and an identity store.

In this embodiment, trust is propagated through session management privileges. One or more specific users in database system 120 are granted these privileges. Middleware (i.e., in middle tier 110) creates and manages sessions in database system 120 for other application users.

In an embodiment, such middleware is session manager 118. In this embodiment, session manager 118 may or may not be configured to implement techniques described previously (i.e., regarding transparently integrating a user's security context in database system 120). Upon authentication of an end-user, session manager 118 creates a session in database system 120. An object (e.g., a Java object) for the database session is created in middle tier 110. The object is encapsulated within an existing application session in middle tier 110. APIs to create the database session and provide access to the database session may be confined to session manager 118. Thus, a middle-tier application does not need to include code that calls session management operations, such as create session, attach session, detach session, and destroy session.

The delegated trust implies that if middle tier 110 can authenticate session manager 118 to database system 120, then session manager 118 can perform the corresponding task of initiating the creation and management of authenticated sessions for application users in database system 120. Application users continue to be authenticated by one or more authentication components of middle tier 110.

In an embodiment, session manager 118 has access to credential data, such as a username and password, that session manager 118 uses to establish trust with database system 120. The credential data may be managed in secure store that is configured to give access to the correct mid-tier component(s). Thus, the credential data uniquely identifies session manager 118. The trust may be established when software components of middle tier 110 are initialized (or start up) and session manager 118 transmits the credential data to database system 120. Any subsequent session management operations (e.g., create or attach) initiated by session manager 118 are authorized against privileges assigned to session manager 118 in database system 120.

In other words, session manager 118 is a dedicated application user (referred to herein as a "dispatcher user") that is assigned privileges, in database system 120, manage sessions. Thus, database system 120 stores privileged user data that indicates a set of privileges that are assigned to the dispatcher user (i.e., session manager 118). This privileged user data and password may be specified in a configuration file of database system 120. Thus, at start-up, database system 120 may receive that password from an application user, asserting that the application user is a dedicated (and trusted) application user.

Without the dispatcher user, the user representing the session for the connections in connection pool 116 user would require session management privileges. Thus, the trust on a connection pool user to create sessions is replaced with trust on the dispatcher user to create sessions. The dispatcher user no longer needs to stay connected to database system 120 (as with a connection pool user). With each create and attach session operation to database system 120, the validity of the dispatcher user credentials is asserted.

6.2 Allowing Session Management Operations

Prior to initiating a session management operation, a mid-tier application (e.g., application 112) obtains a connection from a connection pool in middle tier 110. The mid-tier application then issues a data request to database system 120 using the connection. Session manager 118 intercepts the data request and sends, to database system 120, trust data that database system 120 uses to determine whether session manager 118 is a dispatcher user. Example trust data includes the original password that was transmitted by session manager 118 to database system 120 (e.g., at startup of middle tier 110), a commonly-known token (which may change for each application data request), or a digital signature that session manager 118 generates (e.g., using a private key) and that database system 120 is able to verify (e.g., using a shared public key). If database system 120 verifies the trust data as valid, then database system 120 allows a session management operation to be performed, such as creating a database session or attaching a database session to the connection.

In an embodiment, multiple dispatcher users may be established in database system 120. Each dispatcher user may be associated with a different password and with a different set of privileges. Each dispatcher user may be for a different mid-tier application. For example, application 112 may be associated with session manager 118 while application 114 is associated with a second session manager (not depicted in FIG. 1). Thus, if application 114 obtains a connection to database system 120 and sends a data request through the connection, then the second session manager (as opposed to session manager 118) intercepts the data request and transmits, to database system 120, trust data that the second session manager previously received from database system 120.

As another example, multiple dispatcher users may be used, each for a different application user group in database system 120.

6.3 Transparency Scenarios

Session manager 118 may operate in one or more transparency scenarios. One scenario is referred to as the "transparent scenario" described previously where a mid-tier application (e.g., application 112) does not explicitly call any session management operations (e.g., create session, attach session, etc.). Instead, session manager 118 piggybacks, for example, a LWS ID on an application data request. Thus, database system 120 presumes, based on the LWS ID, that the corresponding LWS (such as a Real Application Security (RAS) session in Oracle) should be attached to the connection or associated with the application data request. Another scenario is referred to as the "non-transparent scenario" where an application explicitly calls session management operations. When acting as a privileged application user, session manager 118 may operate differently depending on which scenario session manager 118 is operating.

In the transparent scenario, session manager 118 initiates a call to create a session. The create session call is passed in the same connection on which the query will be executed. Session manager 118 includes, in the create session call, trust data that database system 120 uses to determine whether session manager 118 has the privilege to initiate the creation of sessions. Later, when a mid-tier application issues a data request over a connection to database system 120, session manager 118 may explicitly call a method to attach the session to the connection so that the data request will be associated with the session. Session manager 118 includes trust data in the call. Thus, database system 120 will receive the trust data prior to receiving the data request. Alternatively, session manager 118 inserts (or piggybacks) the trust data into the data request. Thus, database system 120 may receive the trust data with the data request.

In the non-transparent scenario, an application (e.g., application 114) explicitly calls one or more session management operations, such as create session or attach session. Session manager 118 intercepts the calls and inserts trust data into the calls before forwarding the calls to database system 120.

6.4 Secure Exchanges of Trust Data

To ensure the integrity and authenticity of communication with the database system, the middle-tier and database connection components (e.g. JDBC) in the middle tier might provide the necessary security mechanisms. If not, session manager 118 is extended to provide such security.

In an embodiment, session manager 118 does not employ such a security mechanism if the following four conditions are satisfied: (1) there is only one session manager in middle tier 110; (2) connections between database system 120 and middle tier 110 are secured with a cryptographic communication protocol (such as Secure Sockets Layer (SSL) or Transport Layer Security (TLS)); (3) no middleware code except database connection (e.g., JDBC) code can set the identifier of the dispatcher user for the session operations, and (4) Java (or other programming language) code-based security can be used to create code-level protection domains. Nevertheless, session manager 118 may still implement a security mechanism to ensure the authenticity and integrity of communications with database system 120 for an additional layer of protection.

In some situations, placing connection components (such as JDBC components) and session manager 118 in the same (e.g., Java) protection domain may not be possible. Also, there may not be a secure channel from session manager 118 to database system 120. This implies that the action of creating session by session manager 118 must be asserted by session manager 118.

To address both of these issues, a security protocol is implemented to ensure authenticity and integrity of session management operations initiated by session manager 118. One example security protocol is referred to herein as the "secure token protocol." Under this protocol, database system 120 derives a session key based on the username and password or other credentials transmitted (e.g., upon startup) by session manager 118 to database system 120. Database system 120 transmits the session key to session manager 118. For each session management action (e.g., create or attach), session manager 118 uses the session key to generate, based on content of a message that is to be authenticated, a message authentication code (MAC) or "token". The token may be a one-time token where a new token is generated for each session management action. Alternatively, the same token may be used for multiple session management actions for a single session life cycle (e.g., create, attach, detach, and destroy). In such a scenario, the same token may be used for each session management action for a single session in order to authenticate each session management action.

By sending the content and the token, session manager 118 is asserting that session manager 118 is trusted. The protocol may further involve rekeying the session key after a certain amount of time or usage of the session key.

Another example security protocol is public-key cryptography where both session manager 118 and database system 120 have a private (or secret) key and a public key. Session manager 118 using the private key to "sign" content to generate a digital signature. The signed content may be content of a session management call, which may have been initiated by a mid-tier application or by session manager 118. Alternatively, the signed content may be content of an application data request, such as a SQL query. Database system 120 verifies the digital signature by processing the digital signature using the public key and comparing the result with the signed content. If the result matches the original content, then the message is presumed authenticated.

6.5 Example System Architecture for Delegating Trust

Figure 4:
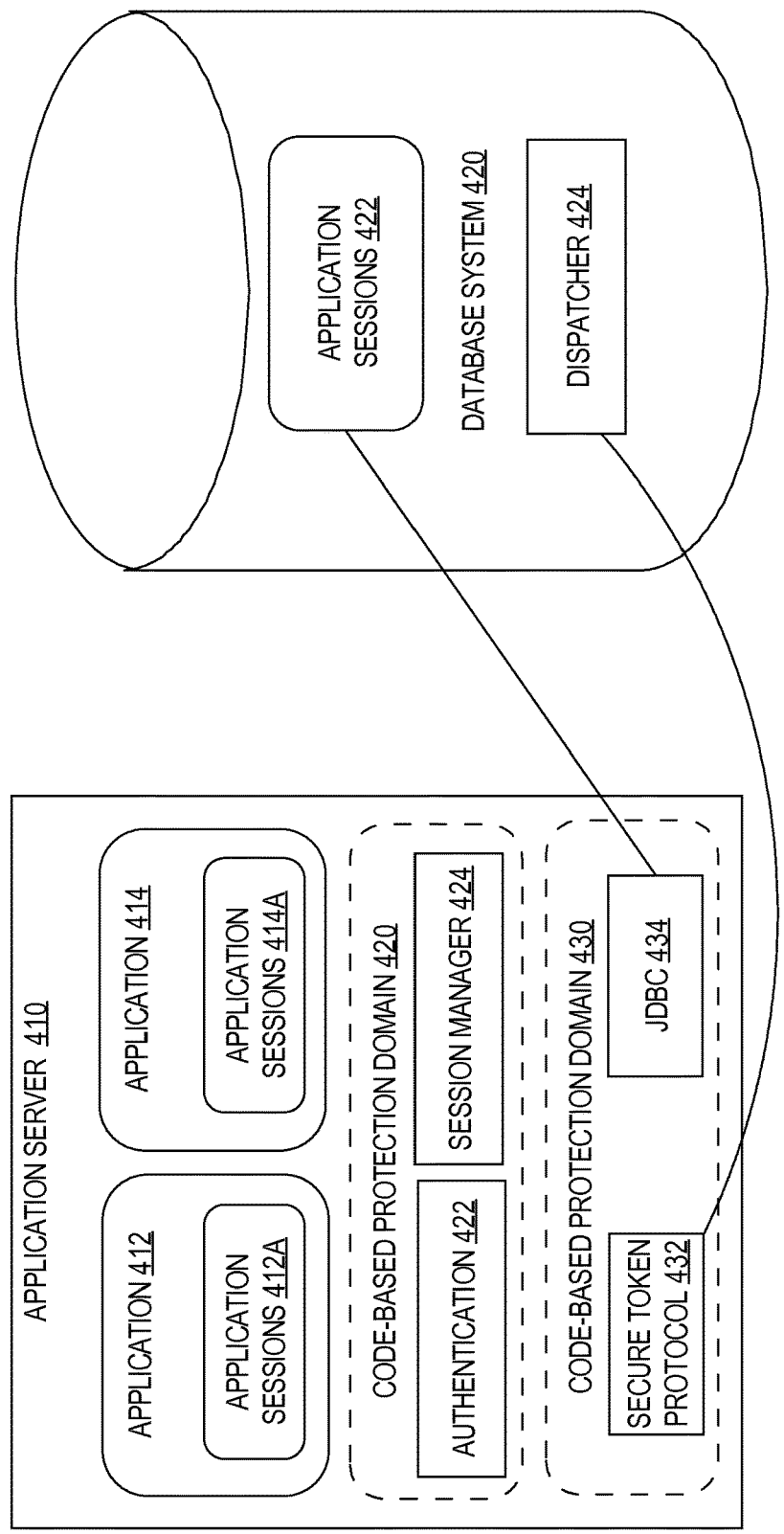
FIG. 4 is a block diagram that depicts an example system architecture for delegating trust, in an embodiment.

FIG. 4 is a block diagram that depicts an example system architecture 400 for delegating trust, in an embodiment. System architecture includes an application server 410 and a database system 420. Application server 410 comprises applications 412 and 414, and two code-based protection domains 420 and 430. Code-based protection domain 420 includes (1) an authentication component 422 for authenticating end users of application server 410 and (2) session manager 424. Code-based protection domain 430 includes (1) Secure Token Protocol 432 for authenticating session manager 424 as the dispatcher user and (2) JDBC 434 for establishing connections between applications 412 and 414 and database system 420. When an application data request (e.g., a SQL query) is executed on a connection, the data request is associated with a database session. When an attach session operation is invoked before executing the data request, the database session becomes an application session. Hence, the data request is executed in an application session context.

Data about some of those sessions is maintained by application 412 as application sessions 412A. Data about others of those sessions is maintained by application 414 as application sessions 414A.

Data about the sessions on the database side is maintained by database system 420 as application sessions 422. Database system 420 also includes dispatcher 424, which is information about a dispatcher user in application server 410. In this example, session manager 424 is initiated with the dispatcher user credential.

Thus, while JDBC 434 is used to establish connections between applications 412 and 414 and database system 420 to allow applications 412 and 414 to submit application data requests, Secure Token Protocol 432 is used to generate a token that establishes trust for session manager 424. A token generated user Secure Token Protocol 432 guarantees the integrity of the session management operations.

6.6 Example Process of Delegating Trust

Figure 5:
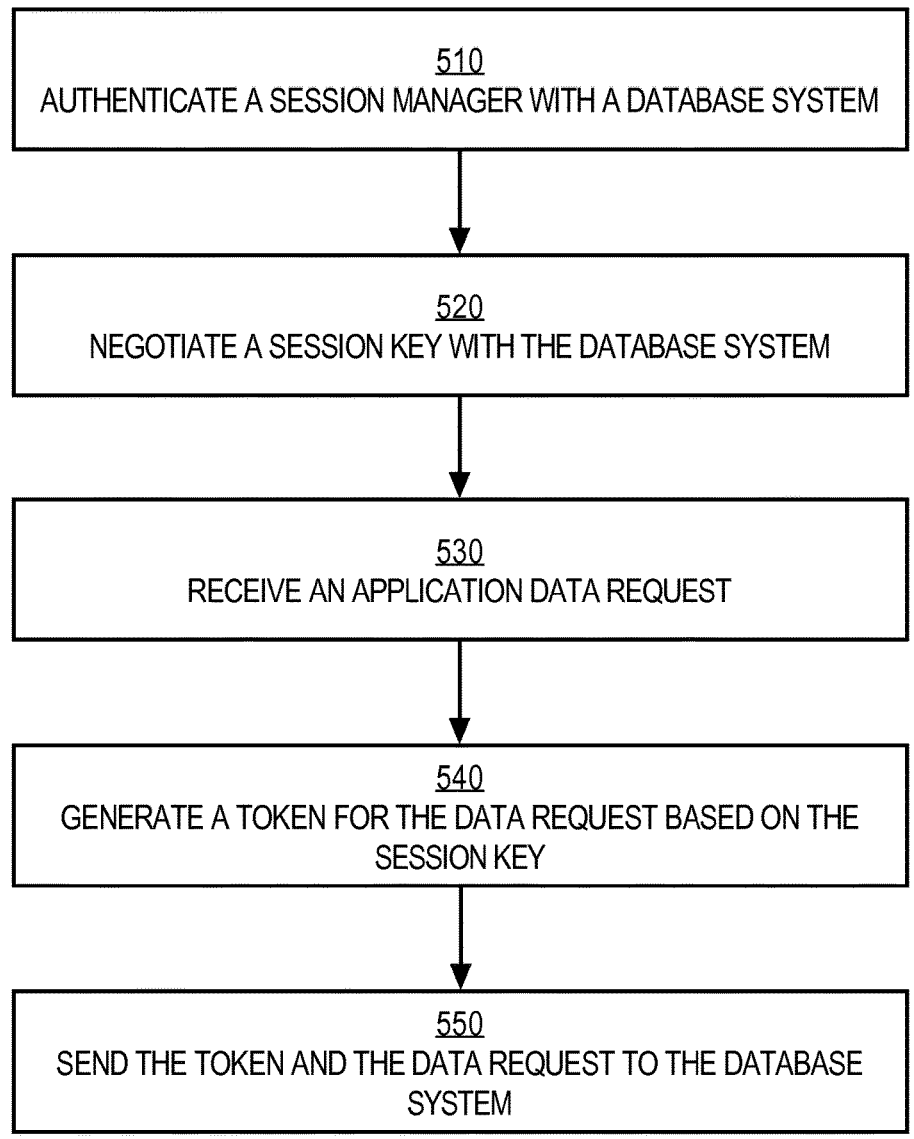
FIG. 5 is a flow diagram that depicts a process for authorizing an application user to a database system, in an embodiment.

FIG. 5 is a flow diagram that depicts a process 500 for authorizing an application user to a database system, in an embodiment. Process 500 may be performed by session manager 118.

At block 510, authenticate with database system 120. Authenticating may involve sending verification data to database system 120. The verification data is created based on a password to verify that session manager 118 has the password. The verification data may be sent upon startup or initialization of components in middle tier 110. Thus, the verification data might not be sent to database system 120 in response to an end-user request from a client of middle tier 110.

Prior to block 510, database system 120 stores privilege assignment data that assigns certain privileges (e.g., session management operations) to an entity that can authenticate itself to database system 120 using the password.

At block 520, a session key for session manager 118 is negotiated with database system 120 once the dispatcher user is authenticated.

At block 530, a data request generated by a mid-tier application is received.

At block 540, in response to receiving the data request, a token is generated based on the session key and content of the data request that is for database system 120 to process. The data request may be, for example, a SQL query or a session management call, such as creating a session or attaching a session.

At block 550, the token is sent to database system 120. Block 550 may also involve sending the data request to database system 120 with the token.

As noted previously, instead of receiving the key from database system 120 and generating a token based on the key, session manager 118 might authenticate itself to database system 120 using another type of trust data, such as the original password or a token value that is based on the password and that changes for each session management request sent to database system 120.

An advantage of the delegating trust approaches described herein is that the connection pool session between a mid-tier application and database system 120 no longer requires privileges to create and attach end user sessions. The authorization is performed based on the privileges assigned to the dispatcher user (such as session manager 118). The identity of the dispatcher user is passed for create and attach calls so that database system 120 can authorize the dispatcher user. With this model, "zero-privileged connection pools" can be utilized as the privileges of the connection pool user are no longer used or needed.

The delegating approaches described herein are different from other trust delegation models, such as the "proxy user" model used in some enterprise applications. One difference is that, in the approaches described herein, privileges of the connection user are not used. Embodiments do not have to infer that the connections of the application connection pools are secured against misuse.

There are other differences. For example, proxy functionality allows one user (e.g., "tom") to proxy as another user (e.g., "scott"). Though the SQL execution in the database is performed as scott, the underlying user is tom. Even if scott has additional proxy privileges, tom does not gain them. In other words, tom cannot further proxy to another user that scott can proxy to. Also, the underlying auditing of proxy functionality represents the fact that scott is executing as a proxy from tom. In contrast, according to the delegating trust approaches described herein, assuming tom is the dispatcher user, the session in the database is that of scott. Scott can proxy to any other users to which he is authorized.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
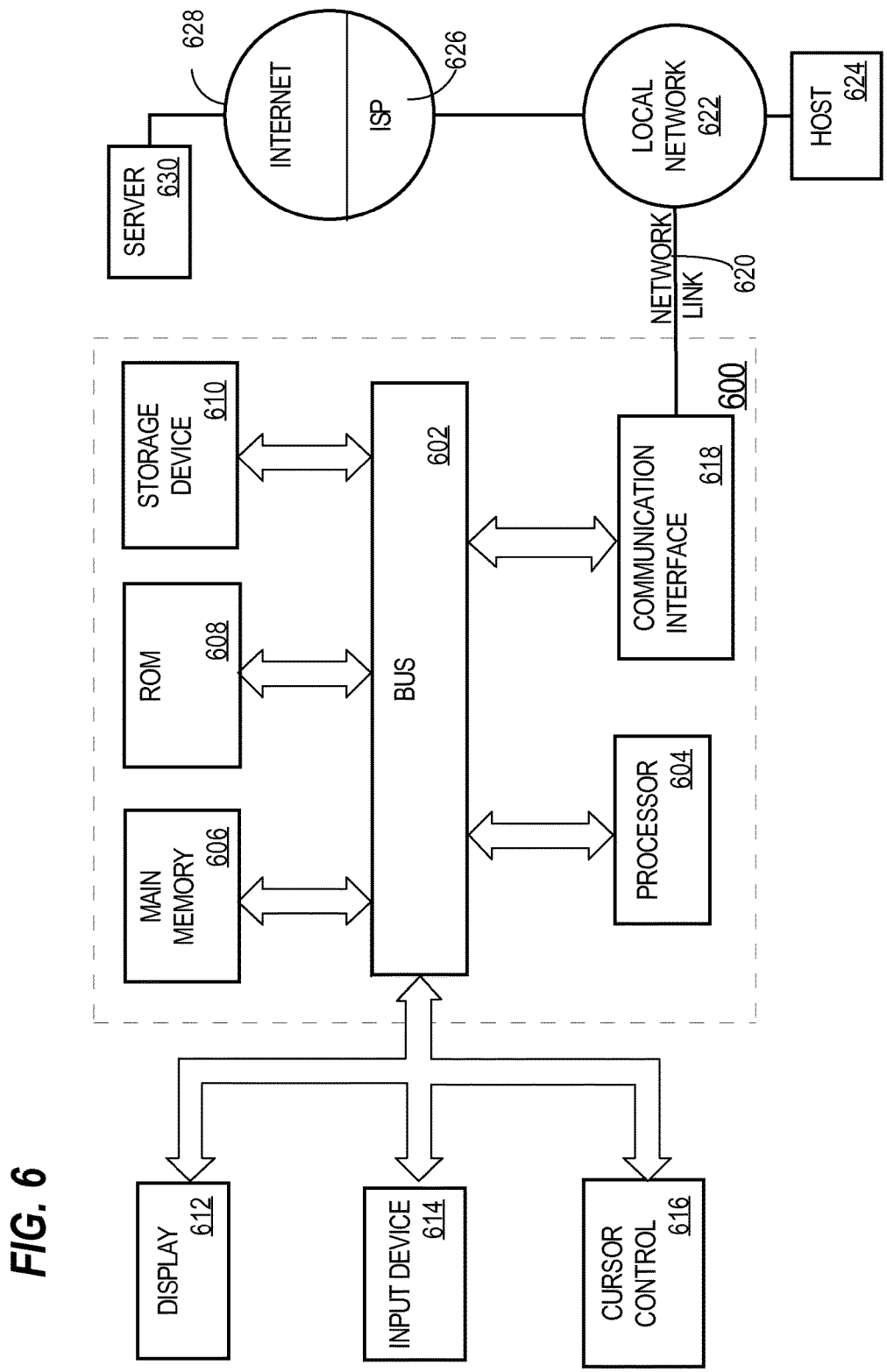
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    initiating, at a middle tier that includes one or more applications, a session manager that is different than each of the one or more applications;
    receiving, by an application that is executing in the middle tier and that is different than the session manager, from a client device that is separate from the middle tier, a client request;
    receiving, by the session manager, from the application executing in the middle tier, a data request that is based on the client request and is to be processed by a database system that stores privilege assignment data that assigns, to the session manager, privileges to create and attach sessions;
    in response to receiving the data request from the application executing in the middle tier and prior to sending the data request to the database system, inserting, by the session manager, into a session management request that is related to a database session that was previously created in the database system, trust data that does not include data from the data request and that is used to authenticate the session manager to the database system, wherein the session management request is a request to attach the database session to a zero-privilege connection between the application in the middle tier and the database system;
    after inserting the trust data into the session management request, sending, over the zero-privilege connection, the session management request from the middle tier to the database system;
    wherein the database system determines, based on the trust data, whether to grant the session management request;
    wherein, after determining to grant the session management request, the database system processes the data request to generate a result;
    receiving, from the database system, by the application, the result of processing the data request;
    in response to the client request, sending the result to the client device;
    wherein the method is performed by one or more computing devices.

2. The method of claim 1, wherein:
the session management request is a second session management request;
the method further comprising, prior to sending the second session management request:
  inserting, by the session manager, into a first session management request to create the database session, second trust data (1) that is based on credential data that was sent from the middle tier to the database system prior to receiving the client request and (2) that authenticates the session manager to the database system;
  sending the first session management request from the middle tier to the database system;
the database system determines, based on the second trust data, whether to grant the first session management request.

3. The method of claim 1, further comprising, prior to inserting the trust data into the session management request:
  receiving, from the database system, at the session manager, a key that is associated with credential data that was sent from the middle tier to the database system prior to receiving the client request;
  generating the trust data based on the key.

4. The method of claim 1, further comprising:
in response to receiving the data request:
  the session manager determining the trust data,
  the session manager generating the session management request, and
  after sending, to the database system, the session management request that includes the trust data, causing the data request to be sent to the database system.

5. The method of claim 1, further comprising, prior to inserting the trust data into the session management request:
  receiving, by the session manager, the session management request from the application of the one or more applications.

6. The method of claim 1, wherein the session management request is a first session management request that is based on the client request, the method further comprising, based on the client request:
  inserting, by the session manager, second trust data into a second session management request that is different than the first session management request,
  after inserting the second trust data into the second session management request, sending the second session management request from the middle tier to the database system.

7. The method of claim 1, wherein:
the session manager is a first session manager;
first credential data is associated with a first set of privileges;
the method comprising:
  sending, from the middle tier to the database system, the first credential data and second credential data that is associated with a second set of privileges that is different than the first set of privileges;
  initiating, at the middle tier, a second session manager that is associated with the second credential data;
  inserting, by the second session manager, into a second session management request that is related to a second database session, second trust data that is based on the second credential data and that authenticates the second session manager to the database system;
  after inserting the second trust data into the second session management request, sending the second session management request from the middle tier to the database system.

8. A method comprising:
receiving, from a middle tier that includes an application and a session manager, at a database system that stores privilege assignment data that assigns privileges to create and attach sessions to the session manager, first trust data that the session manager generated based on a key and a first session management request that is related to a first zero-privilege connection between the database system and the middle tier;
wherein the first session management request is a request to attach a first session that was previously created in the database system to the first zero-privilege connection between the middle tier and the database system;
in response to receiving the first trust data, authenticating, at the database system, the middle tier based on the first trust data;
in response to determining that the middle tier is authenticated based on the first trust data, performing a first operation indicated by the first session management request;
receiving, at the database system, a first data request that is generated by the application and that is associated with the first session;
processing, at the database system, the first data request to generate a first result;
sending the first result from the database system to the application;
receiving, from the middle tier, at the database system, second trust data that the session manager generated based on the key and a second session management request that is related to a second zero-privilege connection between the database system and the middle tier;
wherein the second session management request is a request to attach a second session, that was previously created in database system, to the second zero-privilege connection between the middle tier and the database system;
in response to receiving the second trust data, authenticating, at the database system, the middle tier based on the second trust data;
in response to determining that the middle tier is authenticated based on the second trust data, performing a second operation indicated by the second session management request;
receiving, at the database system, a second data request that is generated by the application and that is associated with the second session;
processing, at the database system, the second data request to generate a second result;
sending the second result from the database system to the application;
wherein the method is performed by one or more computing devices.

9. The method of claim 8, wherein:
the method further comprising, prior to authenticating the middle tier based on the first trust data:
  receiving, from the middle tier, at the database system, third trust data and a third session management request that is related to the first zero-privilege connection between the database system and the middle tier and that is to create the first session;

in response to receiving the third trust data, authenticating, at the database system, the middle tier based on the third trust data;
in response to determining that the middle tier is authenticated based on the third trust data, creating the first session in the database system.

10. The method of claim 8, wherein the first session management request is implied within the first data request that includes the first trust data and that is generated by the application.

11. The method of claim 8, further comprising: prior to receiving the first trust data:
associating, in the database system, first credential data with a set of session management privileges;
receiving, from the session manager that is executing in the middle tier and that is separate from the application, second credential data;
determining whether the second credential data matches the first credential data;
sending the key to the session manager in response to determining that the second credential data matches the first credential data.

12. One or more non-transitory storage media storing instructions which, when executed by one or more processors, cause:
initiating, at a middle tier that includes one or more applications, a session manager that is different than each of the one or more applications;
receiving, by an application that is executing in the middle tier and that is different than the session manager, from a client device that is separate from the middle tier, a client request;
receiving, by the session manager, from the application executing in the middle tier, a data request that is based on the client request and is to be processed by a database system that stores privilege assignment data that assigns, to the session manager, privileges to create and attach sessions;
in response to receiving the data request from the application executing in the middle tier and prior to sending the data request to the database system, inserting, by the session manager, into a session management request that is related to a database session that was previously created in the database system, trust data that does not include data from the data request and that is used to authenticate the session manager to the database system, wherein the session management request is a request to attach the database session to a zero-privilege connection between the application in the middle tier and the database system;
after inserting the trust data into the session management request, sending, over the zero-privilege connection, the session management request from the middle tier to the database system;
wherein the database system determines, based on the trust data, whether to grant the session management request;
wherein, after determining to grant the session management request, the database system processes the data request to generate a result;
receiving, from the database system, by the application, the result of processing the data request;
in response to the client request, sending the result to the client device.

13. The one or more storage media of claim 12, wherein:
the session management request is a second session management request;
the instructions, when executed by the one or more processors, further cause, prior to sending the second session management request:
inserting, by the session manager, into a first session management request to create the database session, second trust data (1) that is based on credential data that was sent from the middle tier to the database system prior to receiving the client request and (2) that authenticates the session manager to the database system;
sending the first session management request from the middle tier to the database system;
the database system determines, based on the second trust data, whether to grant the first session management request.

14. The one or more storage media of claim 12, wherein the instructions, when executed by the one or more processors, further cause, prior to inserting the trust data into the session management request:
receiving, from the database system, at the session manager, a key that is associated with credential data that was sent from the middle tier to the database system prior to receiving the client request;
generating the trust data based on the key.

15. The one or more storage media of claim 12, wherein the instructions, when executed by the one or more processors, further cause:
in response to receiving the data request:
the session manager determining the trust data,
the session manager generating the session management request, and
after sending, to the database system, the session management request that includes the trust data, causing the data request to be sent to the database system.

16. The one or more storage media of claim 12, wherein the instructions, when executed by the one or more processors, further cause, prior to inserting the trust data into the session management request:
receiving, by the session manager, the session management request from the application of the one or more applications.

17. The one or more storage media of claim 12, wherein:
the session management request is a first session management request that is based on the client request;
the instructions, when executed by the one or more processors, further cause, based on the client request:
inserting, by the session manager, second trust data into a second session management request that is different than the first session management request,
after inserting the second trust data into the second session management request, sending the second session management request from the middle tier to the database system.

18. The one or more storage media of claim 12, wherein:
the session manager is a first session manager;
first credential data is associated with a first set of privileges;
the instructions, when executed by the one or more processors, further cause:
sending, from the middle tier to the database system, the first credential data and second credential data that is associated with a second set of privileges that is different than the first set of privileges;
initiating, at the middle tier, a second session manager that is associated with the second credential data;
inserting, by the second session manager, into a second session management request that is related to a second database session, second trust data that is based on the second credential data and that authenticates the second session manager to the database system;

after inserting the second trust data into the second session management request, sending the second session management request from the middle tier to the database system.

19. One or more non-transitory storage media storing instructions which, when executed by one or more processors, cause:

receiving, from a middle tier that includes an application and a session manager, at a database system that stores privilege assignment data that assigns privileges to create and attach sessions to the session manager, first trust data that the session manager generated based on a key and a first session management request that is related to a first zero-privilege connection between the database system and the middle tier;

wherein the first session management request is a request to attach a first session, that was previously created in the database system, to the first zero-privilege connection between the middle tier and the database system;

in response to receiving the first trust data, authenticating, at the database system, the middle tier based on the first trust data;

in response to determining that the middle tier is authenticated based on the first trust data, performing a first operation indicated by the first session management request;

receiving, at the database system, a first data request that is generated by the application and that is associated with the first session;

processing, at the database system, the first data request to generate a first result;

sending the first result from the database system to the application;

receiving, from the middle tier, at the database system, second trust data that the session manager generated based on the key and a second session management request that is related to a second zero-privilege connection between the database system and the middle tier;

wherein the second session management request is a request to create a second session or attach a second session, that was previously created in database system, to the second zero-privilege connection between the middle tier and the database system;

in response to receiving the second trust data, authenticating, at the database system, the middle tier based on the second trust data;

in response to determining that the middle tier is authenticated based on the second trust data, performing a second operation indicated by the second session management request;

receiving, at the database system, a second data request that is generated by the application and that is associated with the second session;

processing, at the database system, the second data request to generate a second result;

sending the second result from the database system to the application.

20. The one or more storage media of claim 19, wherein:
the instructions, when executed by the one or more processors, further cause, prior to authenticating the middle tier based on the first trust data:

receiving, from the middle tier, at the database system, third trust data and a third session management request that is related to the first zero-privilege connection between the database system and the middle tier and that is to create the first session;

in response to receiving the third trust data, authenticating, at the database system, the middle tier based on the third trust data;

in response to determining that the middle tier is authenticated based on the third trust data, creating the first session in the database system.

21. The one or more storage media of claim 19, wherein the first session management request is implied within the first data request that includes the first trust data and that is generated by the application.

22. The one or more storage media of claim 19, wherein the instructions, when executed by the one or more processors, further cause: prior to receiving the first trust data:

associating, in the database system, first credential data with a set of session management privileges;

receiving, from the session manager that is executing in the middle tier and that is separate from the application, second credential data;

determining whether the second credential data matches the first credential data;

sending the key to the session manager in response to determining that the second credential data matches the first credential data.

* * * * *

UNITED STATES PATENT AND TRADEMARK OFFICE
CERTIFICATE OF CORRECTION

PATENT NO. : 10,049,205 B2
APPLICATION NO. : 14/315288
DATED : August 14, 2018
INVENTOR(S) : Ahmed et al.

Page 1 of 1

It is certified that error appears in the above-identified patent and that said Letters Patent is hereby corrected as shown below:

In the Specification

In Column 8, Line 6, delete "or" and insert -- (or --, therefor.

In Column 8, Line 11, delete ""East"" and insert -- "East." --, therefor.

In Column 8, Line 14, delete "attribute," and insert -- attribute. --, therefor.

In the Claims

In Column 21, Line 55, in Claim 7, after "method" insert -- further --.

Signed and Sealed this
Fourteenth Day of May, 2019

Andrei Iancu
*Director of the United States Patent and Trademark Office*